(12) United States Patent
Huang

(10) Patent No.: US 8,650,985 B2
(45) Date of Patent: Feb. 18, 2014

(54) FAUCET CONTROL HANDLE STRUCTURE

(75) Inventor: Li-Chen Huang, Changhua (TW)

(73) Assignee: Alexander Yeh Industry Co. Ltd., Changhua (TW)

( * ) Notice: Subject to any disclaimer, the term of this patent is extended or adjusted under 35 U.S.C. 154(b) by 127 days.

(21) Appl. No.: 13/206,030

(22) Filed: Aug. 9, 2011

(65) Prior Publication Data

US 2013/0036853 A1   Feb. 14, 2013

(51) Int. Cl.
*F16K 31/60* (2006.01)

(52) U.S. Cl.
CPC ...................................... *F16K 31/60* (2013.01)
USPC .......... 74/543; 74/548; 137/315.15; 137/359; 137/625.41; 137/801; 251/288; 251/323

(58) Field of Classification Search
USPC ............... 137/801, 269, 359, 315.15, 625.41, 137/315.12; 251/288, 323, 213, 292; 74/543–548, 523; 16/441, 414; 4/678
IPC ........................................................ F16K 31/60
See application file for complete search history.

(56) References Cited

U.S. PATENT DOCUMENTS

| | | | | |
|---|---|---|---|---|
| 4,557,288 A | * | 12/1985 | Botnick .................. | 137/315.13 |
| 5,025,826 A | * | 6/1991 | Schoepe et al. .......... | 137/315.15 |
| 5,669,404 A | * | 9/1997 | Guillermo ................ | 137/315.12 |
| 6,409,148 B1 | * | 6/2002 | Dempsey et al. ............. | 251/288 |
| 8,266,767 B1 | * | 9/2012 | Huang ............................ | 16/441 |
| 8,459,145 B2 | * | 6/2013 | Huang ............................ | 74/543 |
| 8,567,284 B2 | * | 10/2013 | Huang ............................ | 74/543 |
| 2009/0205719 A1 | * | 8/2009 | Thomas et al. .......... | 137/315.15 |
| 2013/0019708 A1 | * | 1/2013 | Huang ....................... | 74/490.12 |
| 2013/0020518 A1 | * | 1/2013 | Huang .......................... | 251/213 |

FOREIGN PATENT DOCUMENTS

| | | | | |
|---|---|---|---|---|
| JP | 2001-159474 | * | 6/2001 | .............. F16K 31/60 |
| JP | 2007-56916 | * | 3/2007 | .............. F16K 31/60 |

OTHER PUBLICATIONS

English Abstract of JP 2007-56916, Hayashi, Mar. 8, 2007.*
English Abstract of JP 2001-159474, Nishioka, Jun. 12, 2001.*

* cited by examiner

*Primary Examiner* — Vinh Luong
(74) *Attorney, Agent, or Firm* — Che-Yang Chen; Law office of Michael Chen

(57) ABSTRACT

A faucet control handle structure, which can be used in different water control bases with different sizes, including a control handle and a adjustable device, wherein the control handle has a receiving space that has two positioning ribs cross each other to engage with the adjustable device. The adjustable device has an adjustable base, a clamping piece and an adjustable unit, wherein the adjustable base has a sleeve hole, one end of which has a plurality of wedging edges formed at the opening end thereof. A clamping piece that can be adjusted to move back and forth is then formed in an opposing direction of the wedging edge. According to the above structure, since the adjustable device is located at the receiving space of the control handle, it can be used for water control sticks with different sizes of the water control base to enhance the practicability of the faucet handle and increase the convenience during the assembly process.

3 Claims, 8 Drawing Sheets

FAUCET CONTROL HANDLE STRUCTURE

FIELD OF THE INVENTION

The present invention relates to a "faucet control handle structure," and more particularly refers to a receiving space of a control handle having an adjustable device, which can be applied to water control sticks of different water control bases with different sizes, to increase the practicability of the faucet handle and convenience during assembly process.

BACKGROUND OF THE INVENTION

In recent years, the "DIY" style has become popular and people focus more on entire appearance of the faucet, so most people try to replace the faucet handle by themselves start to get rid of the appearance of the old faucet and achieve the goal of changing the exterior of the faucet and eliminating the old thereof. However, various water control bases are different in sizes that cause the corresponding the faucet handles vary in sizes as well, and it is difficult for customers to purchase a suitable faucet handle, which further cause a problem in assembling and replacing the faucet. This is the problem the present invention wants to solve.

SUMMARY OF THE INVENTION

The technical problem to be solved in the present invention is that various faucets are different in sizes that cause the corresponding the faucet handles and vary in sizes as well, and it is difficult for customers to purchase a suitable faucet handle, which further cause a problem in assembling and replacing the faucet. This is the problem the present invention wants to solve.

The technical point to solve the problem mentioned above is that the present invention provides a faucet control handle structure, which can be used in different water control bases with different sizes, including: a control handle having a receiving space that has two positioning ribs cross each other and protrudingly located at open surface of the receiving space. A connecting portion is protrudingly formed at the periphery of the opening end of the receiving space, and the connecting portion has a through hole that provides a locking screw. The handle structure also includes adjustable device having an adjustable base, a clamping piece and an adjustable screw, wherein the adjustable base is located in the receiving space of the control handle, and the adjustable base has a sleeve hole, one end of which has a plurality of positioning slots at the periphery of the opening end. The positioning slots are engaged with the positioning ribs of the control handle, and the other end of the sleeve hole has a plurality of wedging edges formed at the opening end. A screw hole is formed in an opposing direction of the wedging edge and a connecting hole is formed close to the screw hole that is provided for the locking screw to lock. The clamping piece has a clamping surface at an inner surface, and the clamping surface has a second through hole. The adjustable screw has a threaded section that is threadedly engaged with the screw hole of the adjustable base. A top supporting portion is formed at a taper end extended upwards, and a supporting surface is formed at the taper end and against an outer surface of the clamping piece to form a faucet control handle structure.

Comparing with conventional techniques, the present invention has the following advantages: the adjustable device is located at the receiving space of the control handle, so that it can be used for water control sticks with different sizes of the water control base to enhance the practicability of the faucet handle and increase the convenience during the assembly process.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
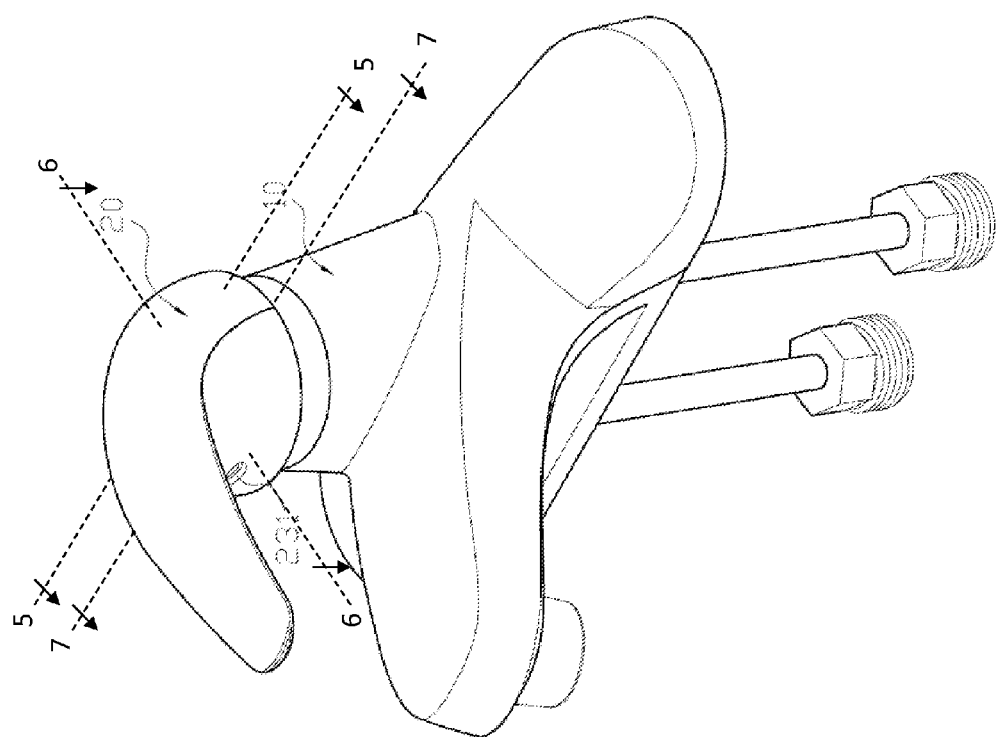
FIG. 1 illustrates a three-dimensional assembled view in the present invention.
Figure 2:
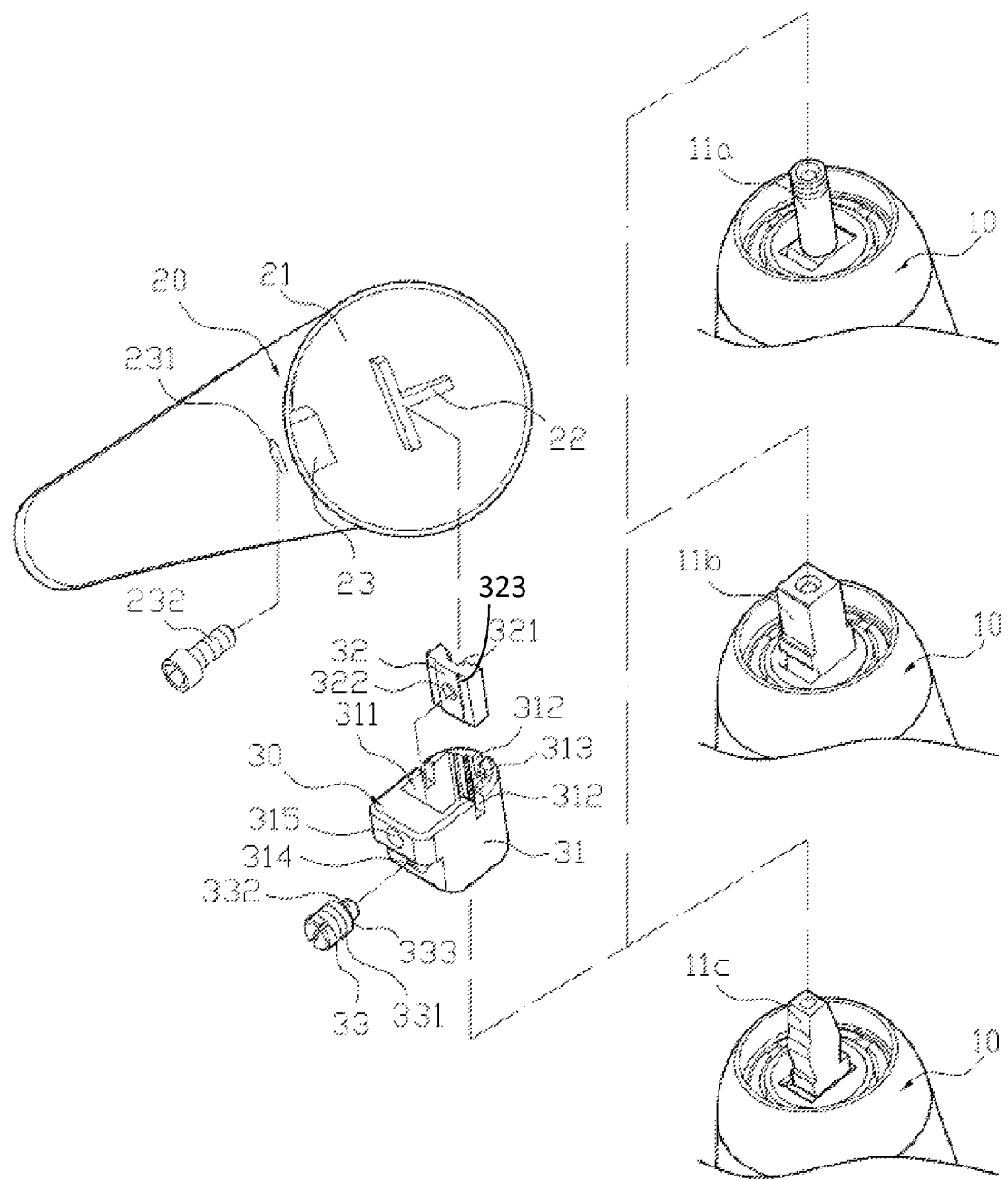
FIG. 2 illustrates a three-dimensional exploded view in the present invention.

In order to further understand the goal, characteristics and effect of the present invention, a number of embodiments along with the drawings are illustrated as following:

Referring to FIGS. 1 and 2, a faucet control handle structure, which can be used in different water control bases (10) with different sizes, includes: a control handle (20) and an connector (30), wherein the control handle (20) recessedly forms a receiving space (21) that has two positioning ribs (22) cross each other and protrudingly located at open surface of the receiving space (21). A connecting portion (23) is protrudingly formed at the periphery of the opening end, and the connecting portion (23) has a through hole (231) that provides a locking screw (232). The connector (30) has an adjustable base (31), a clamping piece (32) and an adjustable screw (33), wherein the adjustable base (31) is located in the receiving space (21) of the control handle (20), and the adjustable base (31) has a sleeve hole (311), one end of which has a plurality of positioning slots (312) at the periphery of the opening end. The positioning slot (312) is engaged with the positioning ribs (22) of the control handle (20), and the other end of the sleeve hole has a plurality of wedging edges (313) formed at the opening end. A screw hole (314) is formed in an opposing direction of the wedging edge and a connecting hole (315) is formed close to the screw hole (314). The clamping piece (32) has a clamping surface (321) at an inner surface, and the clamping surface (321) has a plurality of recessed edges (323) and a second through hole (322). The adjustable screw (33) has a threaded section (331) that is threadedly engaged with the screw hole (314) of the adjustable base (31). A top supporting portion (332) is formed at a taper end extended upwards, and a supporting surface (333) is formed at the taper end and against an outer surface of the clamping piece (32).

Referring to FIG. 2 for a practical use in the present invention, the faucet control handle can connect various sizes of water control bases (10) with different water control sticks (11a) (11b) (11c), wherein one water control stick (11a) is a cylinder, one water control stick (11b) is a square column, and the other one (11c) is a column with two inclined surfaces on both sides.

Figure 3:
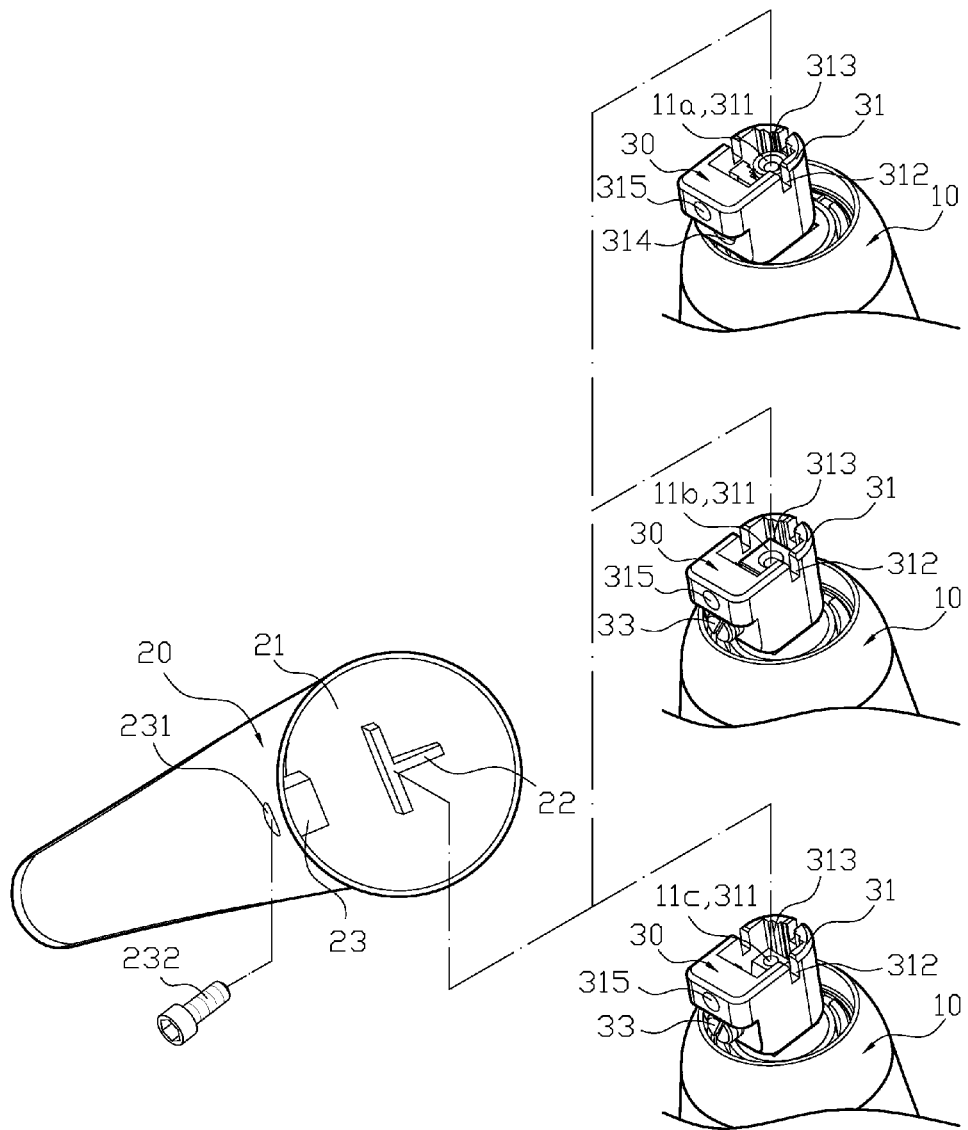
FIG. 3 shows a first schematic view of the assembly process in the present invention.
Figure 4:
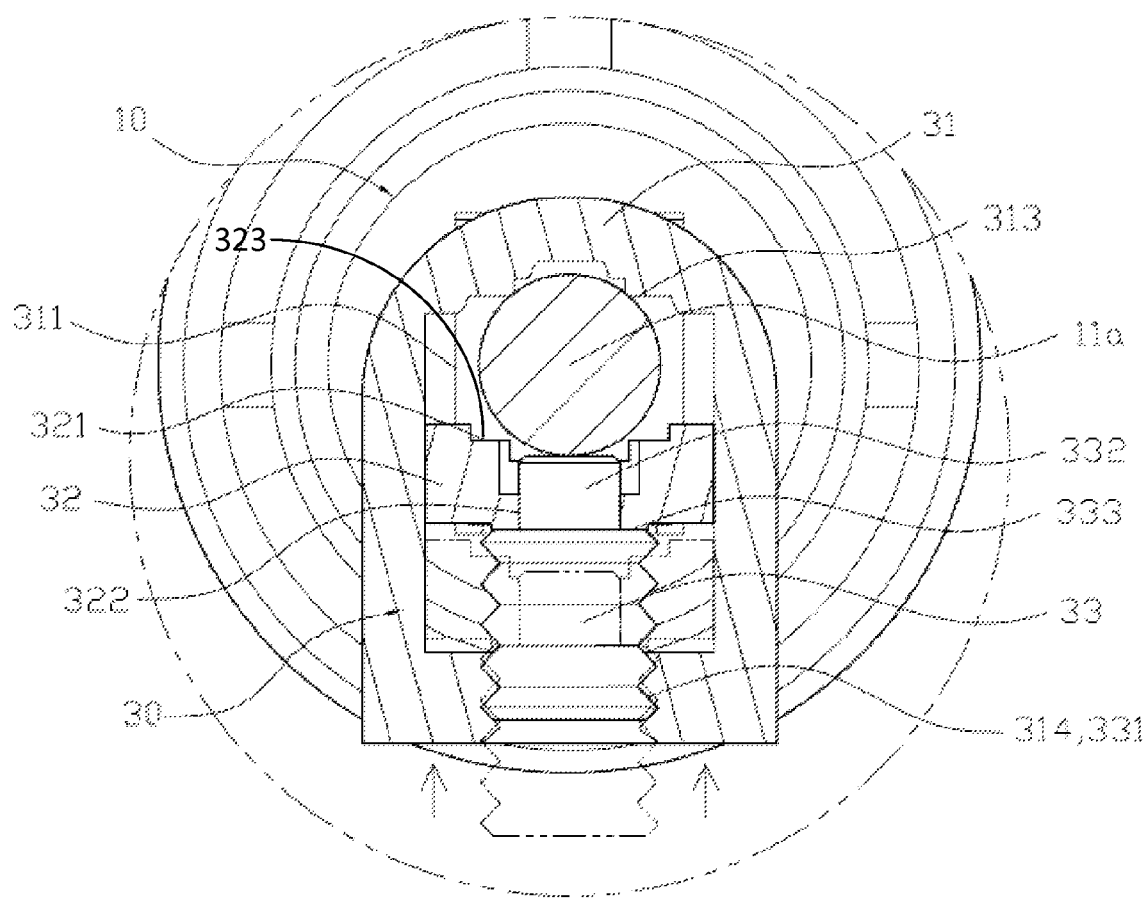
FIG. 4 shows a second schematic view of the assembly process in the present invention.
Figure 5:
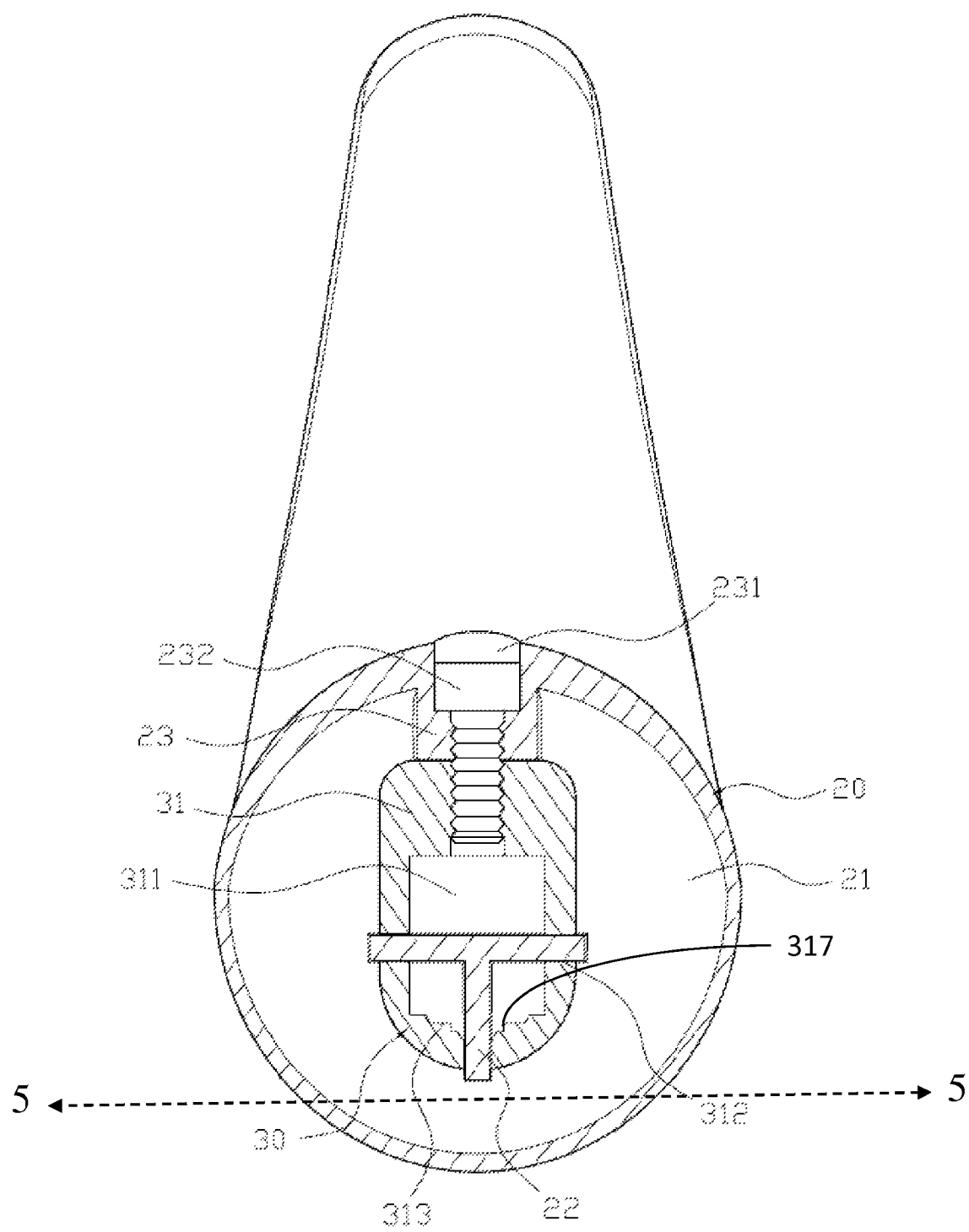
FIG. 5 illustrates a sectional view along line 5-5 in FIG. 1 of the control handle engaged with the adjustable device in the present invention.
Figure 6:
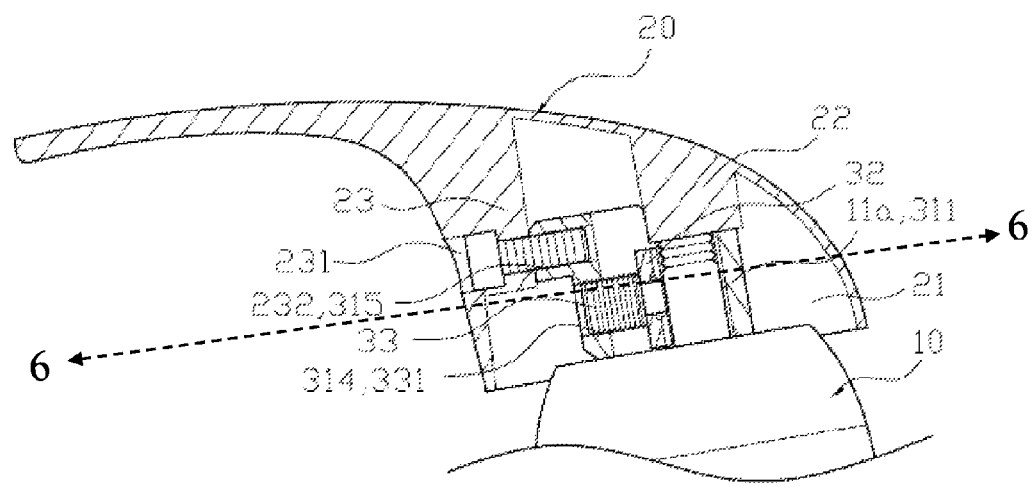
FIG. 6 illustrates a first sectional view along line 6-6 in FIG. 1 of the first assembly style in the present invention
Figure 7:
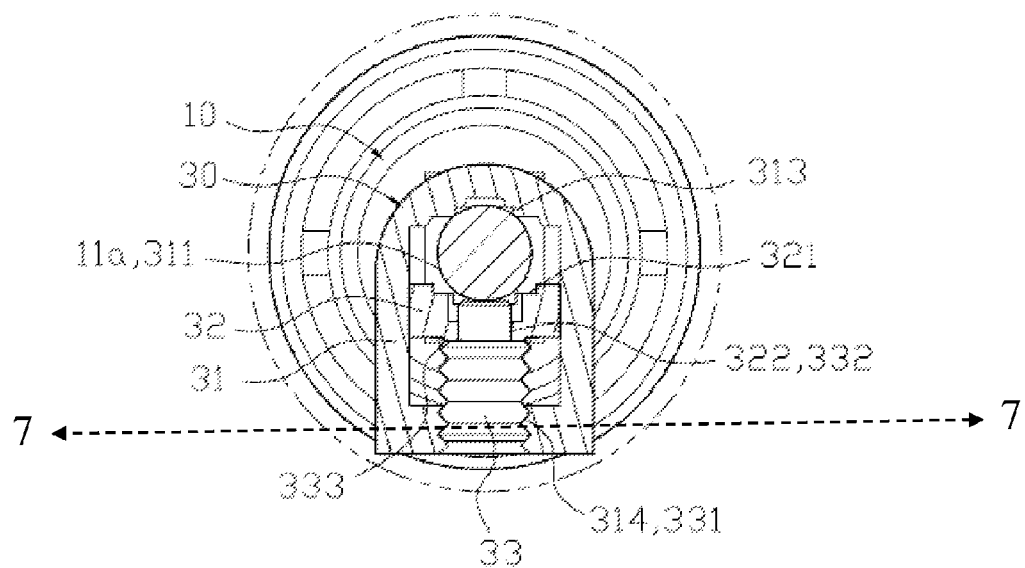
FIG. 7 illustrates a second sectional view along line 7-7 in FIG. 1 of the first assembly style in the present invention.
Figure 8:
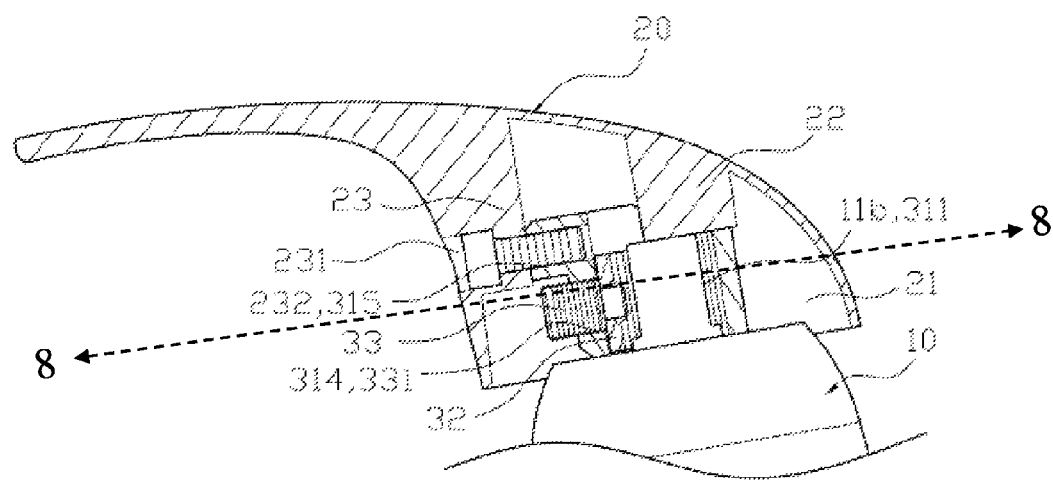
FIG. 8 illustrates a first sectional view along line 8-8 of the second assembly style in the present invention.
Figure 9:
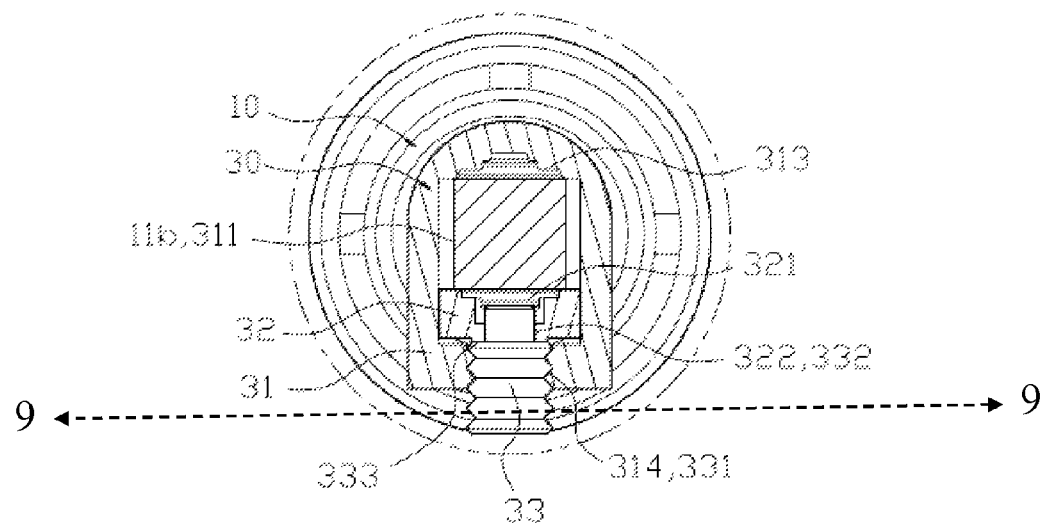
FIG. 9 illustrates a second sectional view along line 9-9 of the second assembly style in the present invention.
Figure 10:
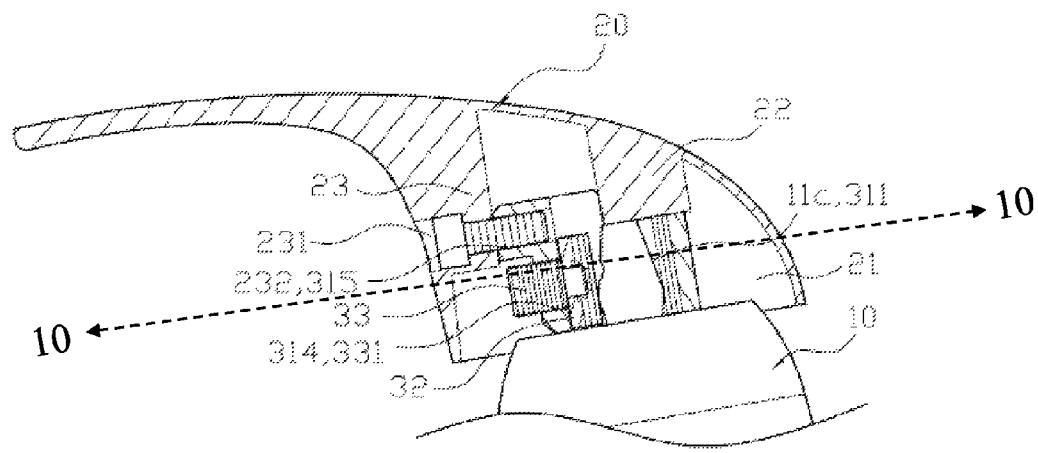
FIG. 10 illustrates a first sectional view along line 10-10 of the third assembly style in the present invention.
Figure 11:
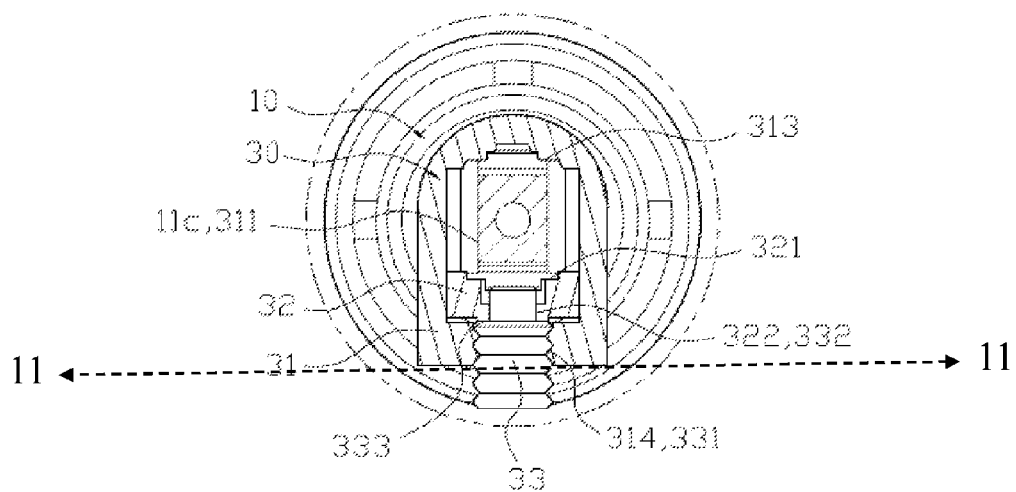
FIG. 11 illustrates a second sectional view along line 11-11 of the third assembly style in the present invention.

Referring to FIGS. 2 and 3, when the control handle (20) is configured to connect to the water control sticks (11a) (11b) (11c) of the water control base (10), the sleeve hole (311) of the adjustable base (31) of the connector (30) is used to cover the water control sticks (11a) (11b) (11c), and the adjustable screw (33) is rotated into the wedging edges (313) of the adjustable base (31), so that the clamping piece (32) is pushed by the supporting surface (333) of the adjustable screw (33) to generate simultaneous movement (see FIG. 4) and the bodies of the water control sticks (11a) (11b) (11c) are pushed by the top supporting portion (332) of the adjustable screw (33) to secure their positions (see FIGS. 7, 9 and 11). Therefore, the control handle (20) covers an outer periphery of the adjustable base (31) through the receiving space (21), and the positioning ribs (22) of the control handle (20) are engaged with the positioning slots (312) of the adjustable base (31) (see FIG. 5), such that the through hole (231) of the control handle (20) is aligned with the connecting hole (315) of the adjustable base (31), and then the locking screw (232) is locked at the connecting hole (315) (see FIGS. 6, 8 and 10) to complete the assembly process. Since the position of the clamping piece (32) can be adjusted by the adjusting unit (33) with screws, the connector (30) can be used for the water control sticks (11a) (11b) (11c) with different sizes. Furthermore, the wedging edge (313) of the adjustable base (31) also has a plurality of recessed edges (317) as well as the clamping surface (321) of the clamping piece (32), so that the connector (30) can be used for different water control sticks (11a) (11b) (11c), to further enhance the practicability of the connector (30).

According to the structure in the abovementioned embodiments, the present invention has the following advantages: the connector (30) is located at the receiving space (21) of the control handle (20), so that it can be used for water control sticks (11a) (11b) (11c) with different sizes of the water control base (10) to enhance the practicability of the faucet handle and increase the convenience during the assembly process.

Having described the invention by the description and illustrations above, it should be understood that these are exemplary of the invention and are not to be considered as limiting. Accordingly, the invention is not to be considered as limited by the foregoing description, but includes any equivalent

What is claimed is:

1. A faucet control handle structure that is applied to different water control bases with different sizes, including:
a control handle having a receiving space that has two positioning ribs cross each other and protrudingly located at an open surface of the receiving space; and a connecting portion protrudingly formed at periphery of an opening end of the receiving space, wherein the connecting portion has a through hole providing for a locking screw; and
a connector having an adjustable base, a clamping piece and an adjustable screw, wherein the adjustable base is located in the receiving space of the control handle, and the adjustable base has a sleeve hole, one end of which has a plurality of positioning slots at periphery of an opening end of the sleeve hole, wherein the positioning slots are engaged with the positioning ribs of the control handle, and the other end of the sleeve hole has a plurality of wedging edges formed at the other opening end, wherein a screw hole is formed in an opposing direction of the wedging edge and a connecting hole is formed close to the screw hole that is provided for the locking screw to lock, wherein the clamping piece has a clamping surface at an inner surface, and the clamping surface has a second through hole, and the adjustable screw has a threaded section that is threadedly engaged with the screw hole of the adjustable base, wherein a top supporting portion is formed at a taper end extended upwards, and a supporting surface is formed at the taper end of the adjustable screw and against an outer surface of the clamping piece.

2. The faucet control handle structure of claim 1, wherein the wedging edge of the adjustable base has a plurality of recessed edges.

3. The faucet control handle structure of claim 1, wherein the clamping surface of the clamping piece has a plurality of recessed edges.

* * * * *